United States Patent [19]
Ortega et al.

[11] Patent Number: 5,830,012
[45] Date of Patent: *Nov. 3, 1998

[54] CONTINUOUS PLASTIC STRIP FOR USE IN MANUFACTURING INSULATIVE HOUSINGS IN ELECTRICAL CONNECTORS

[75] Inventors: Jose L. Ortega, Camp Hill; Carmen A. LaRosa, York Haven; Taj F. Hanna, Hummelstown, all of Pa.; Ricky Lee Fackler, White Bear Lake, Minn.; Melissa Klein Gardner, Mendota Heights, Minn.; Anthony M. Jugovich, Oakdale, Minn.

[73] Assignee: Berg Technology, Inc., Reno, Nev.

[*] Notice: This patent issued on a continued prosecution application filed under 37 CFR 1.53(d), and is subject to the twenty year patent term provisions of 35 U.S.C. 154(a)(2).

[21] Appl. No.: 697,786

[22] Filed: Aug. 30, 1996

[51] Int. Cl.$^6$ ..................................................... H01R 13/40
[52] U.S. Cl. ........................... 439/590; 439/937; 206/722
[58] Field of Search ..................... 439/590, 937; 206/722, 726, 728

[56] References Cited

U.S. PATENT DOCUMENTS

| | | | |
|---|---|---|---|
| 4,404,744 | 9/1983 | Stenz et al. | 29/883 |
| 4,466,692 | 8/1984 | Sonoda | 439/937 |
| 4,832,622 | 5/1989 | Zahn | 439/590 |
| 5,148,596 | 9/1992 | Zahn | 29/842 |
| 5,326,285 | 7/1994 | Maros | 439/717 |
| 5,337,468 | 8/1994 | Zahn | 29/842 |
| 5,616,053 | 4/1997 | Bogursky et al. | 439/590 |
| 5,775,945 | 7/1998 | Bianca et al. | 439/590 |

FOREIGN PATENT DOCUMENTS 0 753 901 A2   1/1997   European Pat. Off. .......... H01R 9/00

OTHER PUBLICATIONS

Digital Equipment Corporation Document No. 1246862-0-0, Sheet 5 of 5, Nov. 1995 Compaq drawing No. 185372, sheet 8 of 9, Nov. 22, 1995.

*Primary Examiner*—Neil Abrams
*Assistant Examiner*—T. C. Patel
*Attorney, Agent, or Firm*—Daniel J. Long; M. Richard Page

[57] ABSTRACT

Disclosed is a plastic strip for use in the manufacture of unshrouded insulative housings for electrical connectors. The strip is comprised of an elongated body having a first and a second end and adjacent the first end there is a cavity for receiving a polymeric molding compound. This cavity allows the strip to be attached end to end a second subsequently formed axially aligned plastic strip to allow for the continuous manufacture of such strips. The strip also includes a plurality of axially spaced apertures for receiving pins or other conductive elements.

77 Claims, 10 Drawing Sheets

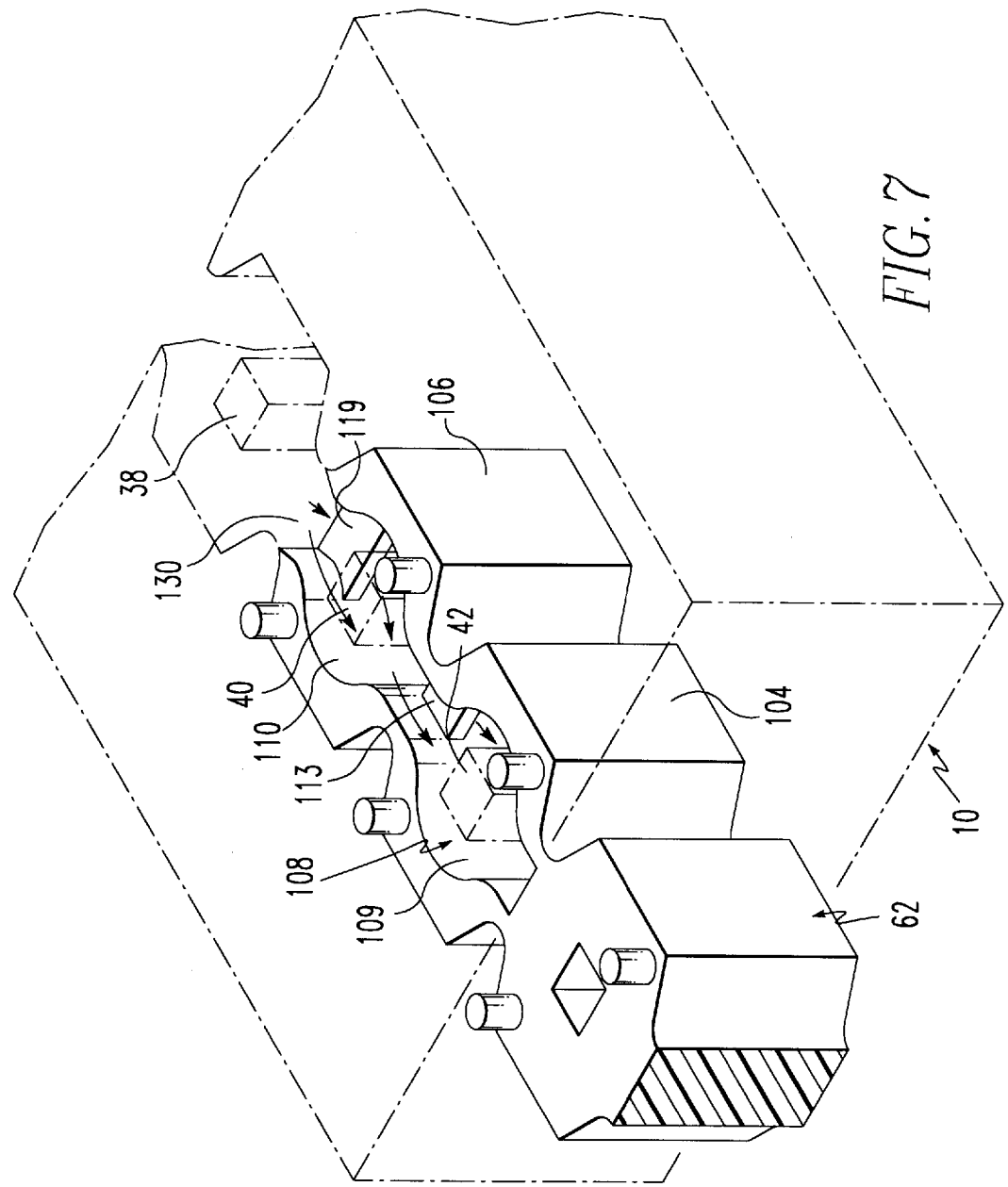

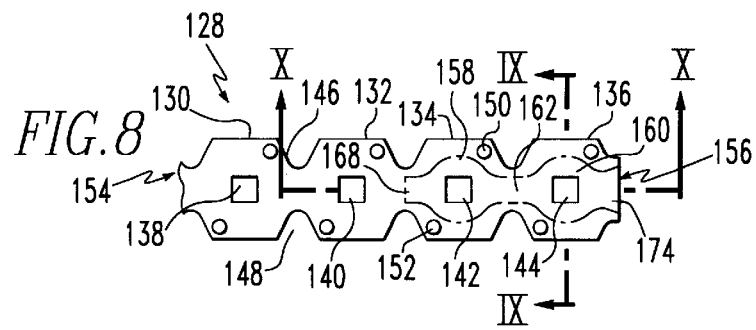
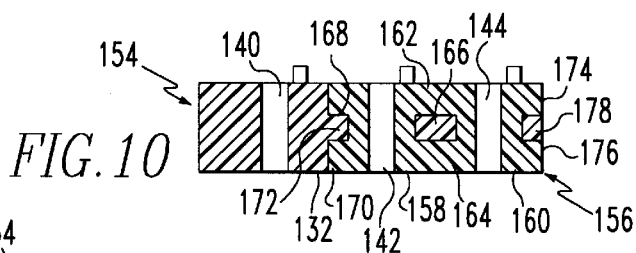
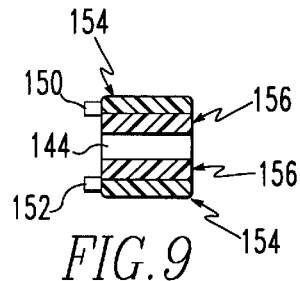
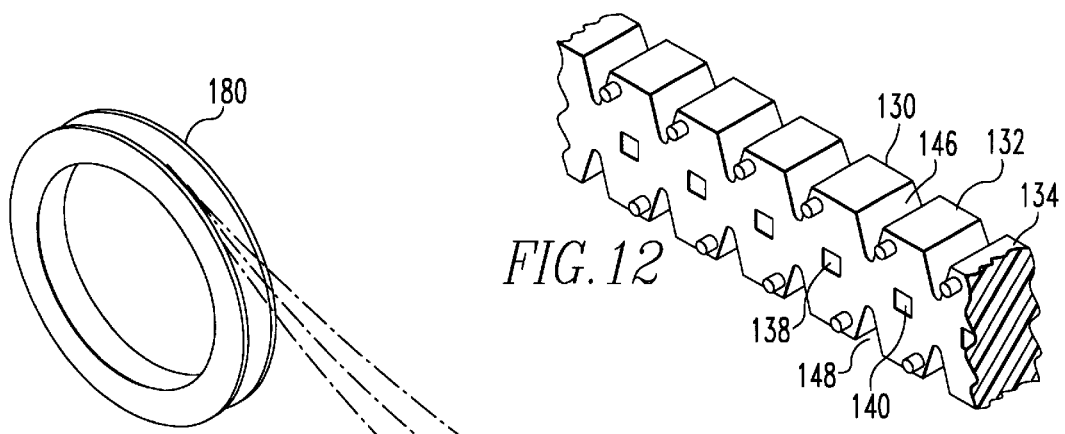
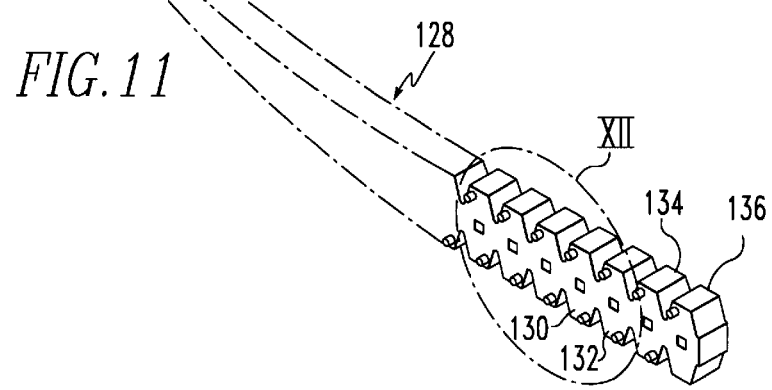

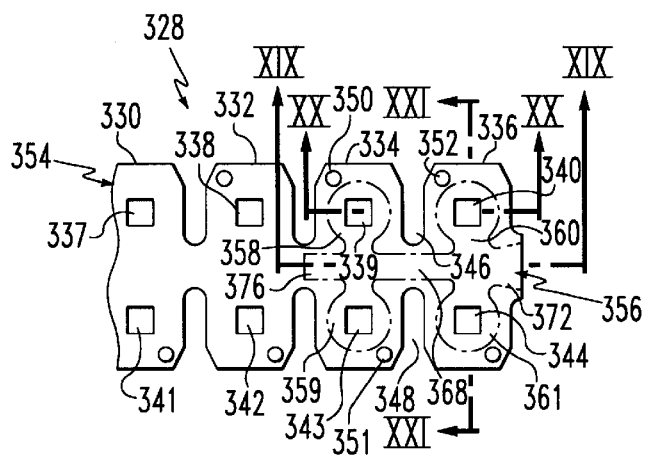
FIG. 18
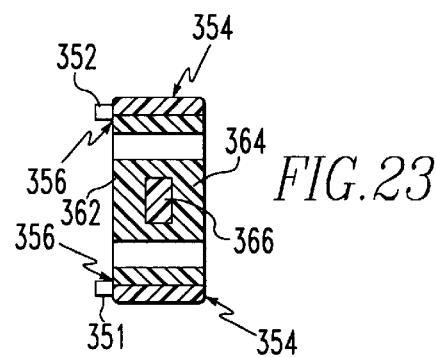
FIG. 23
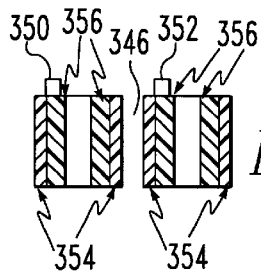
FIG. 20
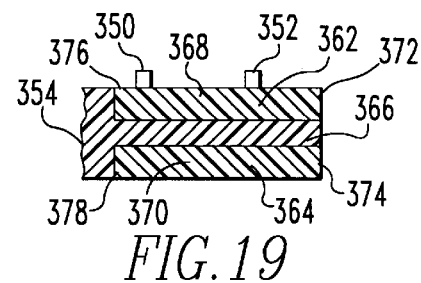
FIG. 19
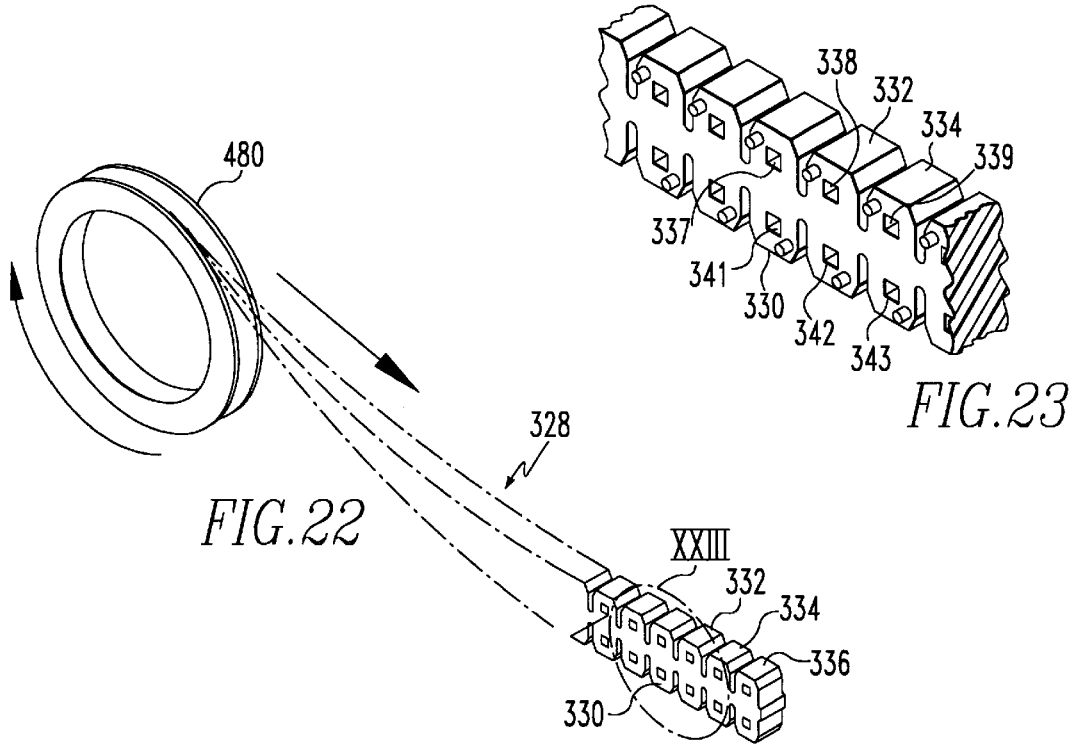
FIG. 22
FIG. 23

CONTINUOUS PLASTIC STRIP FOR USE IN MANUFACTURING INSULATIVE HOUSINGS IN ELECTRICAL CONNECTORS

BACKGROUND OF THE INVENTION

1. Field of the Invention

The present invention relates to electrical connectors and more particularly to plastic strips for use in manufacturing insulative housings for use in electrical connectors.

2. Brief Description of Prior Developments

It has been suggested that the use of pin header connectors in continuous reel form might be desirable due to lower costs of assembly and inventory. By obtaining headers in strip form and using automated assembly equipment to cut parts to length and place, a manufacturer might be able to significantly reduce inventory requirements. Furthermore, component to circuit board assembly throughput rate might also be improved.

The prior art, for example U.S. Pat. No. 4,832,622 to Zahn, teaches the use of continuous extrusion plastic strips for producing insulative plastic strips for use in manufacturing unshrouded housings for electrical headers. One drawback, however, to the continuous extrusion of plastic strips for this purpose is that secondary operations may be required to produce the full finished part configuration. For example, it may be necessary to cut lateral notches to serve as points for segmenting the strip into individual insulative plastic strips. It may also be necessary to perforate the strip to provide apertures for the placement of pins or other conductive members in the completed connectors.

The aforesaid Zahn patent also suggests that a continuous plastic strip may be manufactured in discrete segments by injection molding. In one proposed mode of manufacturing a continuous plastic strip by injection molding, Zahn teaches the use of a separate longitudinal spline as a carrier for the units to be molded. A disadvantage to this approach may, however, be that the use of the separate longitudinal spline may contribute to the complexity and expense of the overall operation. In another proposed mode, Zahn teaches the sequential molding of discrete units in series without a separate spline. Since, however, no specific means may be disclosed for interlocking the sequentially molded segments, the resulting continuously molded strip may lack the degree of flexibility or strength that would be desirable for certain uses such as being capable of being wound on a reel to extended lengths.

A need, therefore, exists for a continuous plastic strip which can be used as or to manufacture an electrical connector housing which does not require expensive finishing operations. A need also exists for such a continuous plastic strip which may be manufactured without a separate longitudinal spline or carrier. A still further need exists for a continuous plastic strip which has the necessary strength and flexibility that would enable it to be wound on a reel at extended lengths to facilitate its subsequent transport and storage.

SUMMARY OF THE INVENTION

The plastic strip of the present invention comprises an elongated body having a first and second end, and adjacent the first end there is a cavity for receiving a polymeric molding compound. A plurality of conductive member receiving means are spaced at intervals between the cavity and the second end. Preferably the cavity is connected to the first end by a recess, groove or slot to allow molding compound to be easily conveyed from the first end into the cavity. Preferably the molding compound receiving cavity is an aperture extending transversely through the plastic strip. More preferably, the cavity comprises a pair of parallel transverse apertures connected by a pair of axial grooves.

Also encompassed within the present invention is a plastic strip for use in manufacturing unshrouded insulative housings for electrical connectors which comprises of elongated body which is formed of two separate polymeric sections. These separate sections are formed by separate shots or injections of a polymeric molding compound during an injection molding process. Typically these first and second polymeric sections will be axially aligned and over the length of the strip there will be a plurality of axially spaced conductor member receiving means. Also preferably, the second polymeric section fills a generally cylindrical shaped space which extends transversely across the plastic strip. More preferably, there can be two generally cylindrically shaped spaces which are connected by a bridge, or still more preferably two bridges positioned and spaced superimposed relation. The conductive member receiving means would preferably be a pin receiving aperture which also extends traversely across the plastic strip in concentric arrangement with one of the transverse cylindrical spaces. In a single pin row arrangement the two generally cylindrically shaped spaces are arranged in axial relation and the bridges would extend axially between them. In a row arrangement four cylindrically shaped spaces could be used. In such an arrangement there are two pairs of spaces in side by side relation and bridges would convert the cylindrically shaped spaces.

The present invention also encompasses the product of a process for continuously manufacturing an insulative plastic strip for an unshrouded insulative housing electrical connector comprising the steps of first providing an elongated mold for forming a length of the plastic strip. The mold has a first and second opposed ends, and adjacent said first section there is a means for forming an end cavity in said length of plastic strip. At spaced intervals there are means for receiving a conductive element. The elongated mold is then filled with a polymeric molding compound, and the molding compound is allowed to harden to form a first length of plastic strip. A cavity is formed in this length adjacent the first end and a plurality of spaced conductive element receiving means are also interposed between the first and second ends of the mold. The first length of plastic strip is then partially displaced from the second end of the mold. The cavity remains in the mold, and the mold is again filled with the polymeric molding compound. The molding compound is then allowed to harden to form a second length of plastic strip contiguous with said first length of plastic strip. This second length of plastic strip is also allowed to harden and the process is repeated until the desired amount of plastic strip is produced.

BRIEF DESCRIPTION OF THE DRAWINGS

The insulative connector plastic strip of the present invention and plastic strip of its manufacture is further described with reference to the accompanying drawings in which:

FIG. 1g is an enlarged view of area Ig in FIG. 1a;

FIG. 7 is a perspective schematic view of a portion of the strip header shown in FIG. 1a during a subsequent step in the manufacture of the plastic strip of the present invention;

FIG. 8 is a top plan view of a portion of the plastic strip similar to FIG. 2 on the completion of a subsequent step in the process of its manufacture;

FIG. 9 is a cross sectional view through IX—IX in FIG. 8;

FIG. 10 is a cross sectional view through X—X in FIG. 8;

FIG. 11 is a perspective view of the strip shown in FIG. 8 as emplaced on a reel;

FIG. 12 is a detailed view of the area within circle XII in FIG. 11;

FIG. 18 is a top plan view of a portion of a plastic strip similar to the plastic strip shown in FIG. 13 on the completion of a subsequent step in the process of its manufacture;

FIG. 19 is a cross sectional view through XIX—XIX in FIG. 18;

FIG. 20 is a cross sectional view through XX—XX in FIG. 18;

FIG. 21 is a cross sectional view through XXI—XXI in FIG. 18;

FIG. 22 is a perspective view of the continuous plastic strip shown in FIG. 18 as emplaced on a reel;

FIG. 23 is a detailed view of the area with circle XXIII in FIG. 22;

DETAILED DESCRIPTION OF THE PREFERRED EMBODIMENTS

Figure 1A:
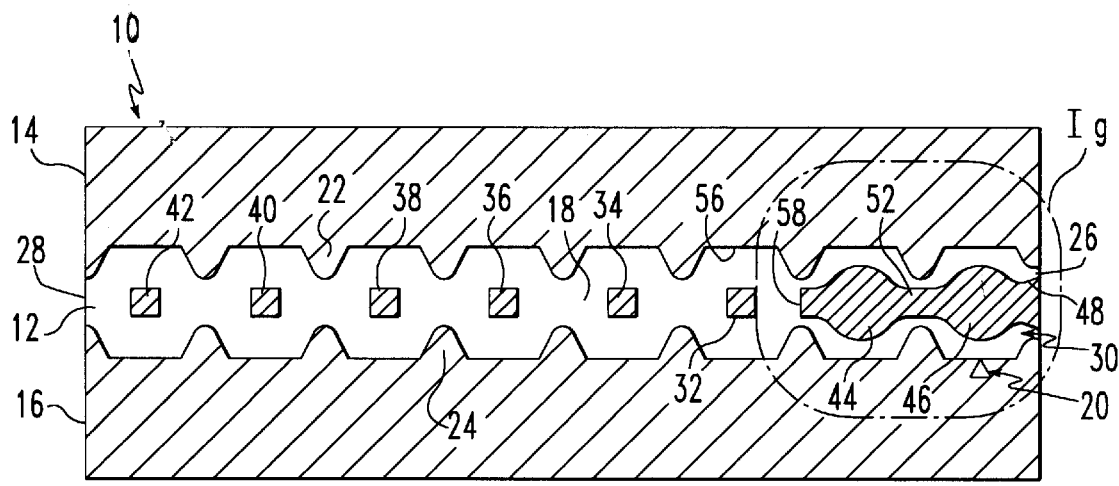
FIGS. 1a–1f are top plan schematic views of a mold for use in the plastic strip of the present invention and a continuous plastic strip produced by the plastic strip of the present invention.
Figure 1B:
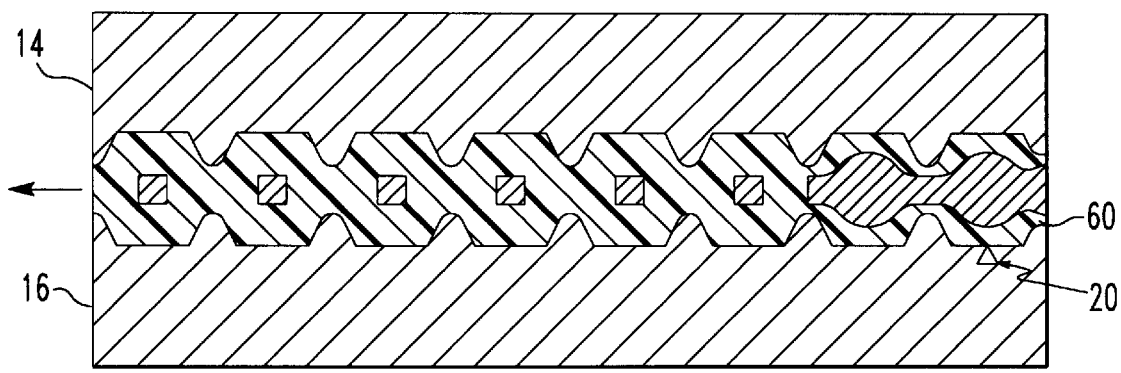

Referring to FIGS. 1a–1f, a mold used in the plastic strip of the present invention is shown generally at numeral 10. This mold includes a base wall 12, and, as is conventional, an upper wall (not shown) in opposed relation to the base wall. As is also conventional, the mold would include side walls 14 and 16 and a molding compound receiving space 18 formed between the side walls and the base and upper walls. As is conventional, molding compound would be introduced into mold space 18 through a gate 20 which is connected to a runner (not shown). A plurality of projections as at 22 and 24 extend respectively from side walls 14 and 16 into space 18. The mold also has a first end 26 and a second article output end 28, and adjacent the first end there is a major cavity producing body 30 which extends upwardly from the base 12 into the space 18. Also projecting from the base 12 into space 18 there are at regular intervals pin opening producing projections 32, 34, 36, 38, 40 and 42. The major cavity producing projection 30 includes cylindrical sections 44 and 46. Referring particularly to FIGS. 1g–1h, between the first end of the mold and cylindrical section 44 there is an upper projection 48 and a lower projection 50 in the body 30. Similarly between cylindrical sections 44 and 46 there is a top medial bridge 52 and a lower medial bridge 54. To the interior side of cylindrical section 46 there is a top interior projection 56 and lower interior projection 58. Referring particularly to FIG. 1b, the mold described above is initially filled with a suitable polymeric molding compound 60. This molding compound is preferably a wholly aromatic thermoplastic polymer and more preferably a mineral-filled liquid crystal polymer such as DUPONT ZENITE 6330 which is a 30% by weight mineral filled liquid crystal polymer. Other suitable polymeric molding compounds would include polyamides, polyesters, polyolefins, polycarbonates, polyketones and polyphenylenes, especially polyphenylene sulfides. The molding compound selected would preferably have a tensile elongation of from 1 percent to 20 percent. The molding compound selected would also have when cured, as will be apparent from the following disclosure, requisite stiffness to maintain spacing for pin insertion and have a flexural modulus of from 300,000 psi to 2,500,000 psi. Particularly for applications in which high temperature capabilities are desired, a mineral-filled polymeric molding compound might be selected.

Figure 1C:
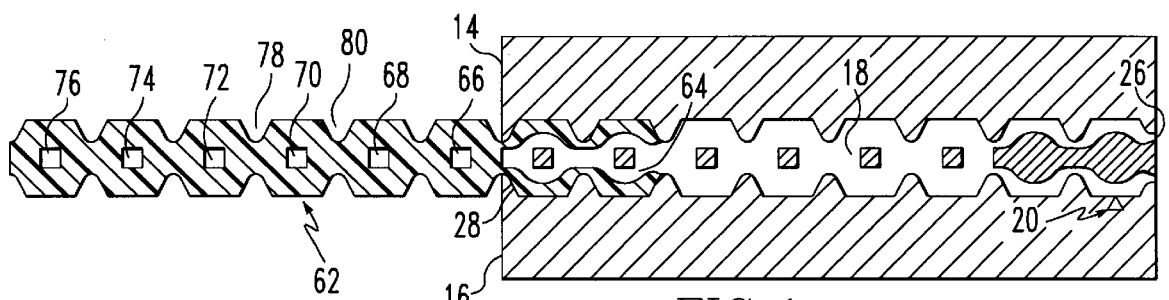
Figure 1D:
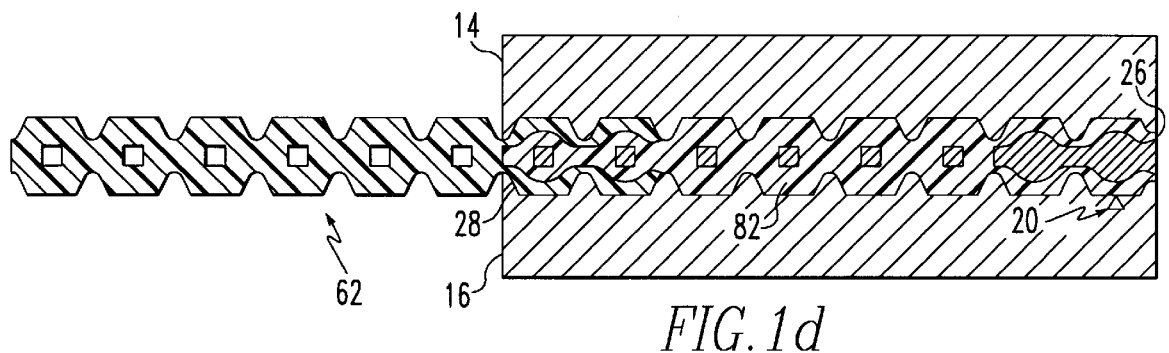
Figure 1E:
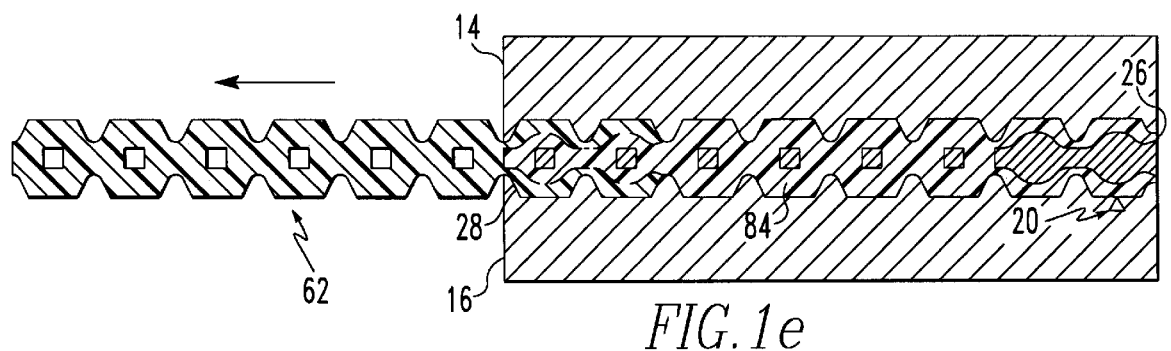
Figure 1F:
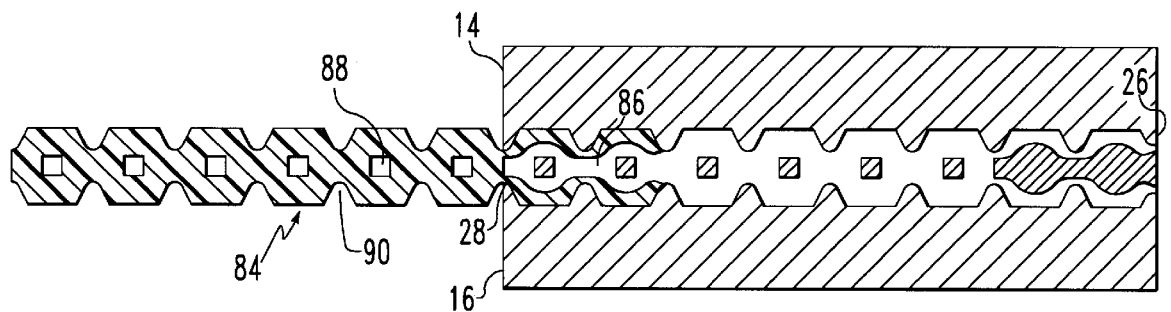
Figure 1G:
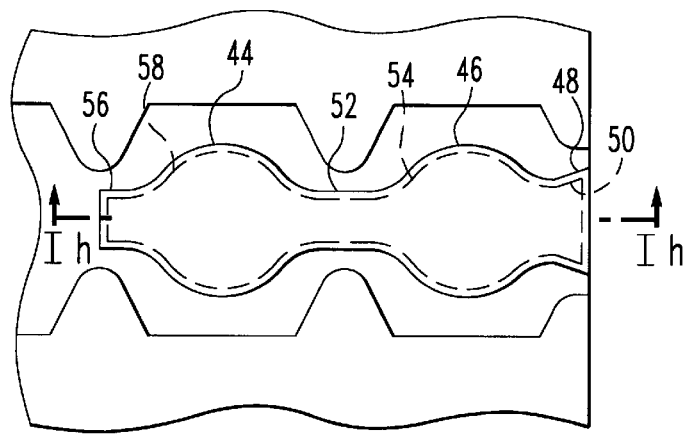
Figure 1H:
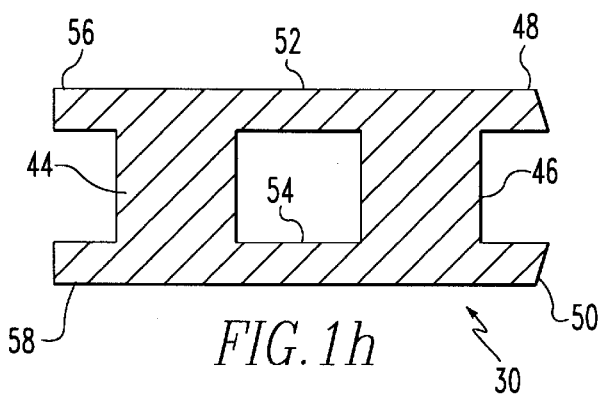
FIG. 1h is a cross sectional view through Ih—Ih in FIG. 1g.

Referring to FIG. 1c, after the molding compound introduced to the mold in FIG. 1b hardens, a first strip length 62 is displaced toward the second or output end of the mold. This first strip length will have a major end cavity 64 which remains inside the mold and a plurality of pin receiving cavities 66, 68, 70, 72, 74 and 76. A plurality of side cavities as at 78 and 80 are also formed in this first strip length. Referring particularly to FIG. 1d, molding compound 82 is again injected into space 18. It will be appreciated that this molding compound also enters major cavity 64 in first strip length 62. Referring to FIG. 1e, after the molding compound 82 hardens, a second strip length 84 which is contiguous with and connected to strip length 62 will be formed. This strip length will itself be displaced from the second output end of the mold. Referring to FIG. 1f, it will be seen that a major cavity 86 will be formed in the second strip length 84, and that this major cavity will remain in the mold. Similarly pin receiving cavities as at 88 and side notches as at 90 will also be formed in the second strip length. Although not shown in the drawings, molding compound will again be introduced to space 18 and to major end cavity 86 of the second strip length. Still another strip length will be formed as a result, and that strip length will be displaced from the second output end of the mold, after which still more molding compound will be injected into space 18 and the major end cavity of the strip length to form still another strip length.

Figure 6:
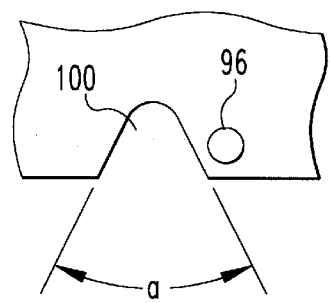
FIG. 6 is an enlarged view of the area within VI in FIG. 2.

Referring to FIGS. 2–6, the continuous plastic strip includes filled segments as at 92 each of which has a pin receiving cavity 94 and spacers as at 96. These continuous strips also include lateral notches as at 98 and 100. These notches serve as point where the plastic strip may be segmented to form individual connector housings. Those notches also contribute to achieving the necessary flexibility in the strip so that it can be wound on a reel as will be explained hereafter. The continuous strips also include an end section shown generally at numeral 102 which are made up of unfilled sections 104 and 106 which have a central major cavity shown generally at 108. This major cavity has two generally cylindrically shaped apertures 109 and 110 which are connected by upper medial recess 111 and lower medial recess 112. These upper and lower medial recesses are separated by bridge 113. Aperture 109 also has a connecting upper lateral recess 114 and a lower lateral recess 115 which are separated by tongue 116. Aperture 110 has a connecting upper lateral recess 117 and a lower lateral recess 118 which are separated by bridge 119. It will be appreciated that lateral recesses 117 and 118 and medial recesses 111 and 112 serve to convey melted molding compound from the end of the strip respectively into apertures 109 and 110. The strip will preferably have a height of from 0.100 inches to 0.500 inches. Its width will preferably be from 0.050 inches to 0.500 inches. Referring particularly to FIG. 6, the notches preferably have an angular width a of from 10° to 75° and have a depth of from 10 percent to 40 percent of the width of the strip. Referring particularly to FIG. 7, the position of the end section after the first strip length has been displaced from the second end of the mold is shown. It will be seen that pin projection producing projections as at 140 and 142 extend upwardly into the two apertures 109 and 110 respectively to the unfilled segments 104 and 106. After the first strip has been partially displaced from the mold through the second end, the major cavity is filled with a second shot or injection of molding compound. This procedure is then repeated until the desired length of the continuous strip is achieved. Preferably the finished continuous strip would be from 5 feet to 5,000 feet in length.

From the above description it will be appreciated that the strip of the present invention may be considered to be characteristically comprised of an elongated body which is formed of separate sections of polymeric molding compound. Referring to FIGS. 8–10, the strip having an insulated body is shown generally at numeral 128. This strip includes segments 130, 132, 134, and 136. These segments have central pin receiving apertures respectively at 138, 140, 142 and 144. The strip also has lateral notches as at 146 and 148 and spacers as at 150 and 152. The insulative strip also includes a first polymeric section shown generally at 154 which is formed from a first shot or injection of a polymeric mold compound. Axially aligned with the first polymeric section is a second polymeric section shown generally at numeral 156 which is formed from a second subsequent shot or injection. This second polymeric section occupies, in part, a first generally cylindrically shaped space 158 and a second generally cylindrically shaped space 160 which are positioned transversely across the height of the strip in parallel relation. It will be understood that these generally cylindrically shaped spaces may be cross sectionally octagonal or hexagonal or any other regular figure and the term "generally cylindrical" will be understood to include such embodiments. These transverse generally cylindrical shapes are connected by an upper axial bridge 162 and a lower axial bridge 164 which also form part of the second polymeric section 156. Interposed between this upper and lower axial bridge there is a first section fill 166. In opposed relation to the axial bridges there is on the transverse cylindrical shaped base 158 and upper axial tongue 168 which is superimposed over a lower axial tongue 170 and which is spaced from that lower axial tongue by a first section fill 172. In opposed relation to the axial bridges on the transverse cylindrical shaped space 160 there is an upper axial tongue 174 which is superimposed in spaced relation to a lower axial tongue 176 and which also make up part of the second polymeric section. The axial tongues 174 and 176 are separated by a first section fill 178.

Referring to FIGS. 11 and 12, the continuous strip 128 may then be wound on a reel 180 for storage or transportation. The reel should be of a sufficient diameter so that a permanent curvature in the plastic strip will not result. Preferably the reel will have a 10 inch inner diameter and more preferably a 20 inch inside diameter on which a continuous strip having a preferred length of from 100 feet to 500 feet would be wound.

Figure 17:
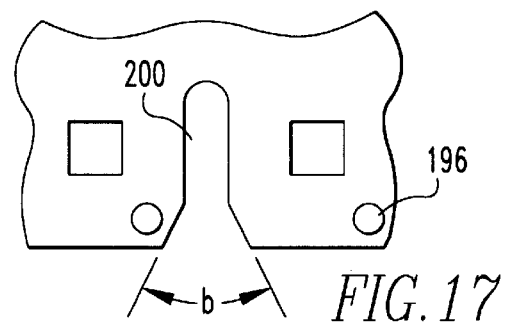
FIG. 17 is an enlarged view of the area within circle XVII in FIG. 13.

Referring to FIGS. 13–17, it will be seen that the steps described above may also be used to make a plastic strip for a two pin row header. The continuous strip includes filled segments as at 192 each of which has a pair of pin receiving apertures 194 and 195 and spacers as at 196. This continuous strip also include notches as at 198 and 200. The continuous strip also includes an end section shown generally at numeral 202 which are made up of unfilled sections 204 and 206 which have a central major cavity shown generally at 208. This major cavity has four apertures 209, 210, 211 and 212 which have lateral bridges 214, 215 and 216 and tongues 218 and 219. The strip will preferably have a height of from 0.050 inches to 0.500 inches. Its width will preferably be from 0.100 inches to 0.500 inches. Referring particularly to FIG. 17, the notches preferably have an angular width b of from about 10° to 75° and have a depth of from 10 percent to 40 percent of the width of the strip.

Referring to FIGS. 18–21, the process of making the continuous strip shown in FIGS. 13–17 is further illustrated. It will be appreciated that these figures are analogous to the part of the plastic strip shown above in FIGS. 8–9. It will also be appreciated that the strip with two rows of pin apertures may also be considered to be characteristically comprised of an elongated body which is formed of separate sections of polymeric molding compound. Referring to FIGS. 18–20, the two row strip having an insulated body is shown generally at numeral 328. This strip includes segments 330, 332, 334, and 336. A first lateral row of pin receiving apertures on these segments is shown at 337, 338, 339 and 340. A second lateral row of pin receiving apertures is shown at 341, 342, 343 and 344. The strip also has lateral notches as at 346 and 348 and spacers as at 350, 351 and 352. The insulative strip also includes a first polymeric section shown generally at 354 which is formed from a first shot or injection of a polymeric mold compound. Axially aligned with the first polymeric section is a second polymeric section shown generally at numeral 356 which is formed from a second subsequent shot or injection. This second polymeric section occupies, in part, a cylindrical shaped spaces 358, 359, 360 and 361 which are each positioned transversely across the height of the strip in parallel relation. The transverse generally cylindrical shapes on opposite sides of the strip are connected by an upper axial bridge as at 362 and a lower axial bridge as at 364 which also form part of the second polymeric section 356. Interposed between this upper and lower axial bridge there is a first section fill as at 366. Between the cylindrical spaces 359 and 360 and cylindrical spaces 361 and 362 there is an upper axial bridge 368 and a lower axial bridge 370 both of which are part of the second polymeric section.

Referring to FIGS. 22–23, the continuous strip 328 may then be wound on a reel 480 for storage or transportation. Preferably the reel will be a at least a 10 inch and more preferably a 20 inch diameter reel on which a continuous strip having a preferred length of from 100 feet to 500 feet would be wound.

Figure 24:
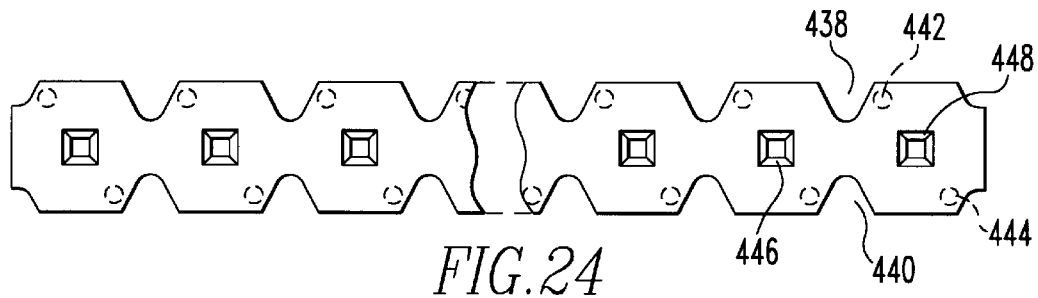
FIG. 24 is a fragmented top plan view of an electrical header which may be manufactured from the plastic strip shown in FIG. 11.
Figure 26:
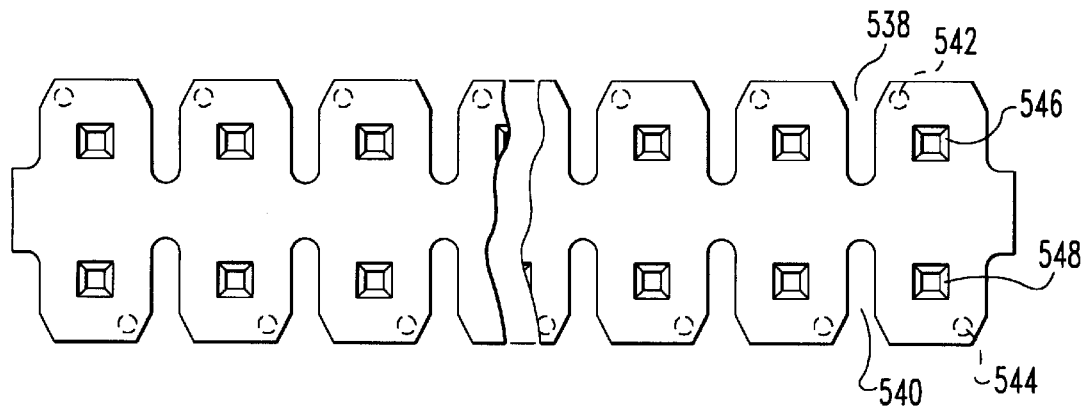
FIG. 26 is a fragmented top plan view of an electrical header which may be manufactured from the plastic strip shown in FIG. 22.
Figure 28:
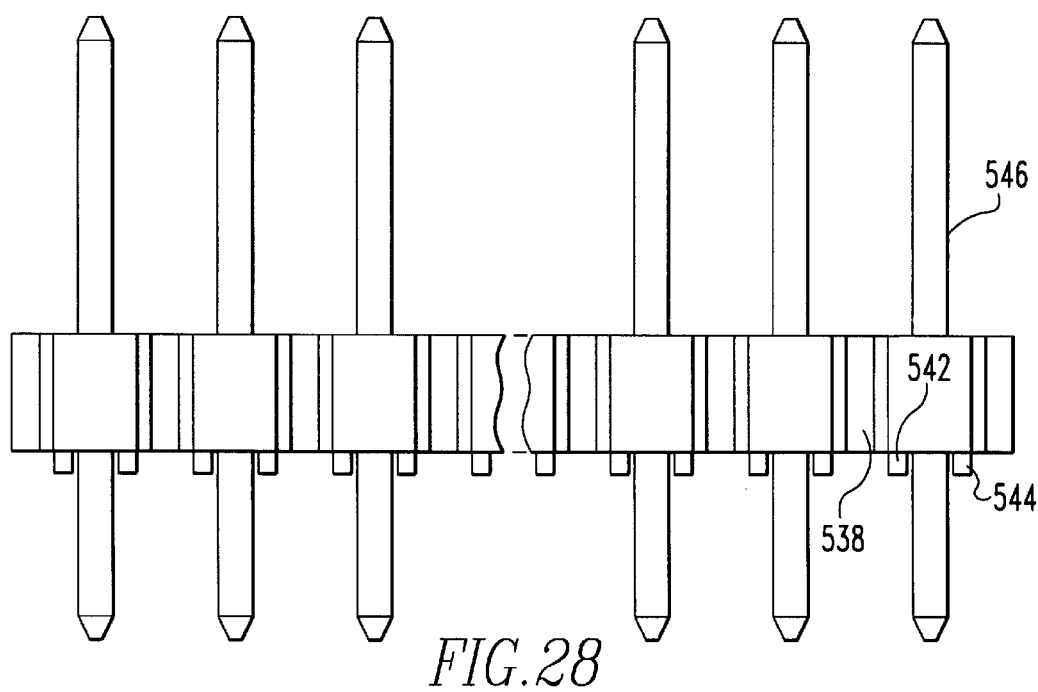
FIG. 28 is a fragmented side elevational view of the electrical header shown in FIG. 26.
Figure 27:
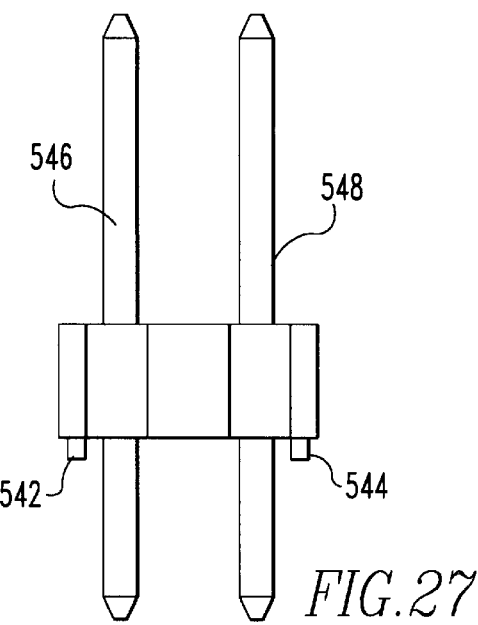
FIG. 27 is an end view of the electrical header shown in FIG. 26.
Figure 25:
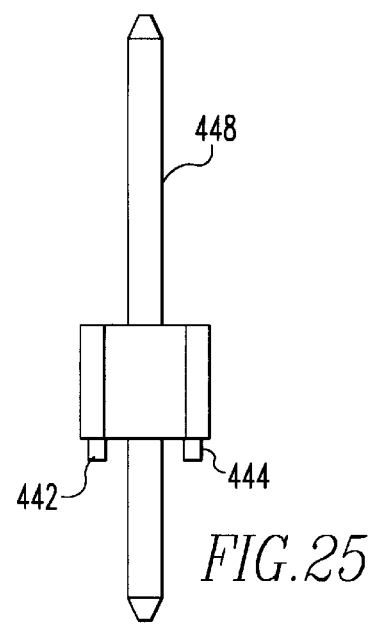
FIG. 25 is an end view of the electrical header shown in FIG. 24.
Figure 29:
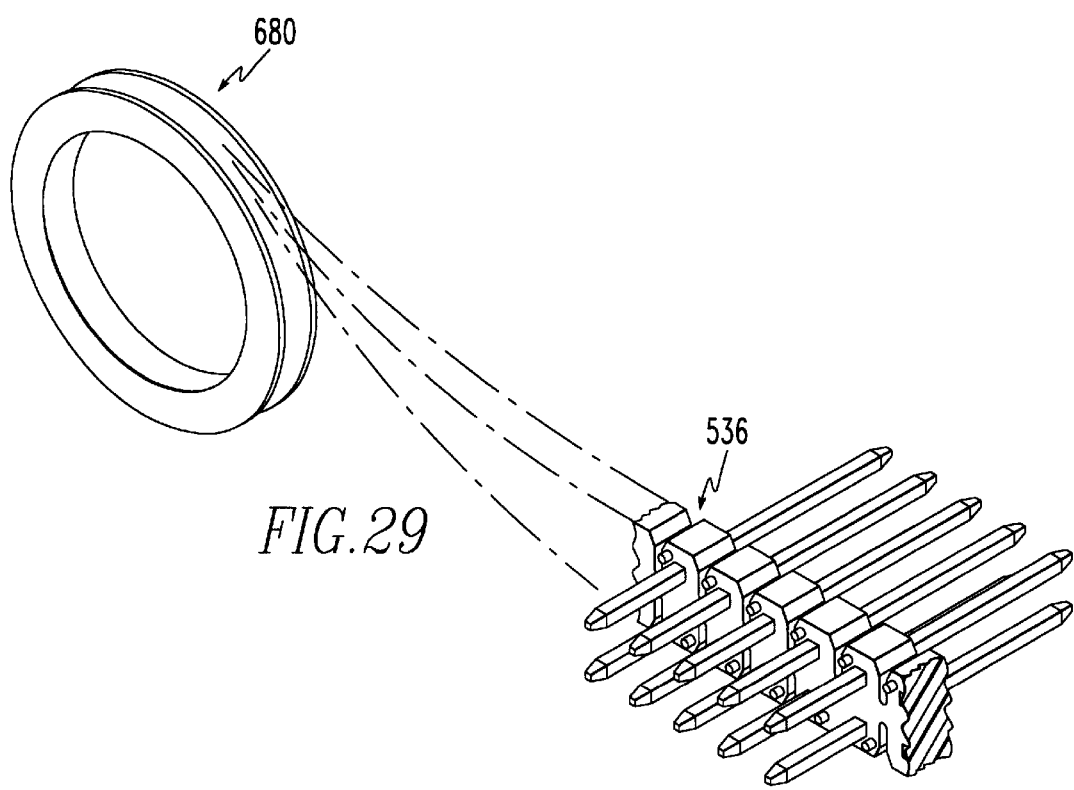
FIG. 29 is a fragmented perspective view of the continuous header shown in FIG. 26 as emplaced on a reel.

Referring to FIGS. 24–25, a single pin row continuous strip with pins in place is illustrated. This strip 436 has notches as at 438 and 440 and spacers as at 442 and 444. Pins as at 446 and 448 may be inserted in any conventional way. Referring to FIGS. 26–29, a continuous strip with pins in place is illustrated. This strip 536 has notches as at 538 and 540 and spacers as at 542 and 544. Pins as at 546 and 548 may be inserted in any conventional way. Referring particularly to FIG. 29, the continuous strip 536 with pins emplaced may then be wound on a reel 680 for storage or transportation. Preferably the reel will be at least a 10 inch and more preferably a 20 inch inner diameter reel on which a continuous strip having a preferred length of from 100 feet to 500 feet would be wound. Ordinarily these reels would be transported to the site of an electronic manufacturer's assembly operation. The manufacturer would then segment the strip at appropriate notch positions to obtain headers of a desired length. Preferably the strip would be segmented by cutting it in any conventional means such as with a band saw or with opposed blades in a scissors or guillotine like action. Preferably such segmentation would be integrated with other electronic assembly operations so that a header would be cut from a reeled strip just prior to the placement of the header on a printed wiring board.

EXAMPLE 1

Figure 2:
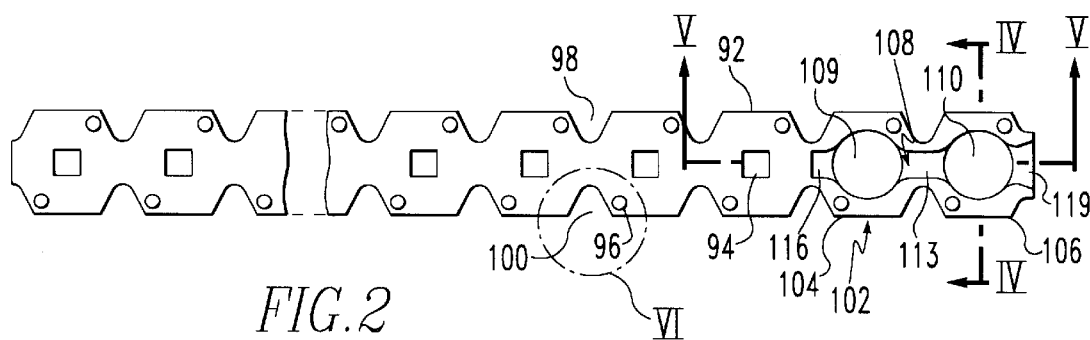
FIG. 2 is a top plan view of a portion of a continuous plastic strip representing a preferred embodiment of the present invention.
Figure 3:
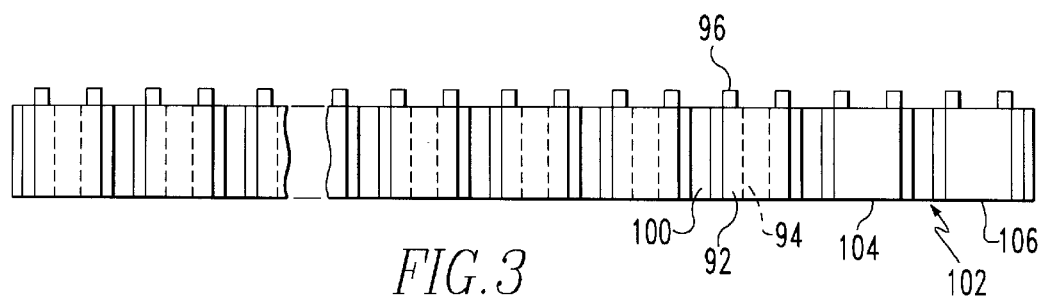
FIG. 3 is a side elevational view of the plastic strip shown in FIG. 2.
Figure 4:
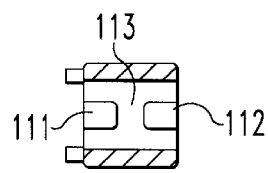
FIG. 4 is a cross sectional view through IV—IV in FIG. 2.
Figure 5:
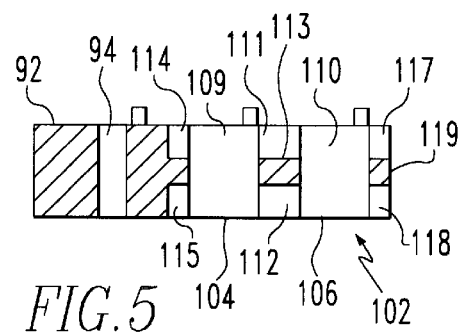
FIG. 5 is a cross sectional view through V—V in FIG. 2.

A mold was constructed to produce an insulative strip similar to that shown in FIG. 2. The strip was 0.100 inches in height and 0.095 inches in width. Notches were separated by 0.100 inch and were 0.028 inch in depth and had an angular size of 54°. The length of the strip in the mold was 3.60 inches. The molding compound used was DUPONT ZENITE 6330 (black), a wholly aromatic liquid crystal polymer. The length of the strip in the mold was 3.60 inches. The tensile elongation of the molding compound was 4 percent and its flexural modulus was 2.1 million psi. The mold was filled with the molding compound, and a first insulative strip was produced. Mold temperature was 160° F. and nozzle heater temperature was 660° F. As was described above, this strip was displaced from the second end of the mold, and the mold was again filled with molding compound while the cavity in the first strip was engaged with the molding compound. Strips were continuously produced in the above described manner until an overall length of about 800 feet was achieved. 400 feet of this strip was wound on a 20 inch inner diameter reel. The remainder of this strip was approximately evenly divided and wound on three 20 inch inner diameter reels.

EXAMPLE 2

Figure 13:
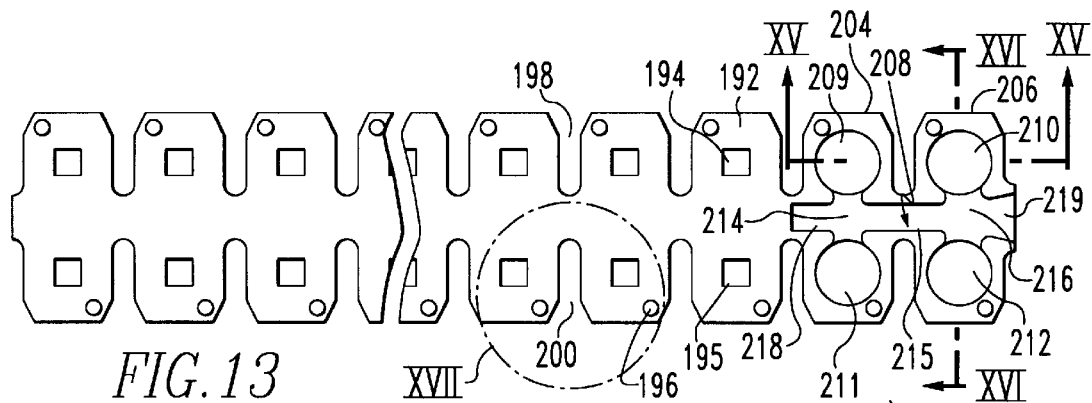
FIG. 13 is a is a top plan view of a portion of a continuous plastic strip representing an alternate preferred embodiment of the present invention.
Figure 16:
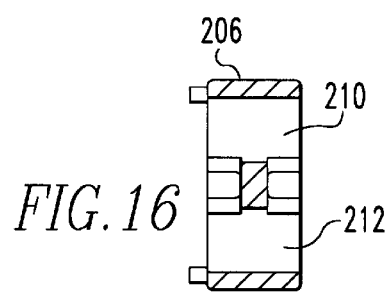
FIG. 16 is a cross sectional view through XVI—XVI in FIG. 13.
Figure 14:
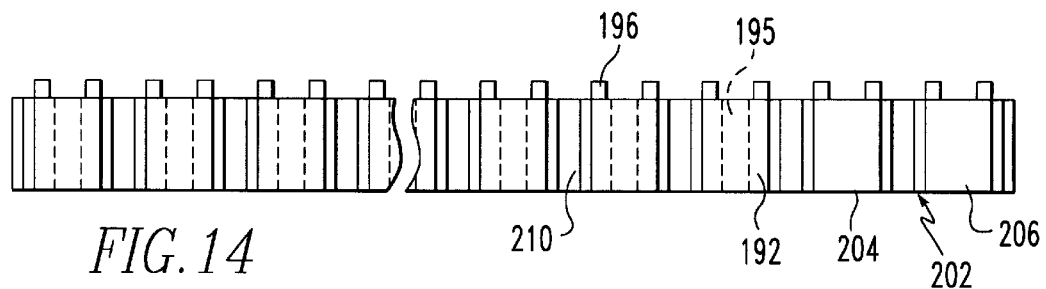
FIG. 14 is a side elevational view of the continuous plastic strip shown in FIG. 13.
Figure 15:
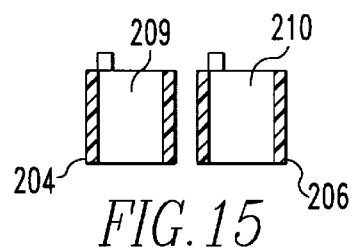
FIG. 15 is a cross sectional view through XV—XV in FIG. 13.

A mold used to produce an insulative strip similar to that shown in FIG. 13 was made. The strip width was 1.960 inches and the height of the strip was 1.000 inches. The notches were separated by 0.100 inches and were 0.075 inches in depth and had an angular size of 54°. The molding compound, mold temperature and nozzle heater temperature were the same as Example 1. In the way described above, lengths of plastic strip were continuously produced until a strip of the length of about 800 feet was available. 400 feet of the strip was wound on a 20 inch inner diameter reel. The remaining strip was approximately evenly divided on three 20 inch inner diameter reels.

It will be appreciated that a plastic strip and apparatus for economically and efficiently continuously producing an insulative strip for use in manufacturing an unshrouded insulative housing for an electrical connector has been disclosed.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A plastic strip used in the manufacture of unshrouded insulative housings for electrical connectors without use of a separate longitudinal spine or carrier comprising an elongated body having a first and second end and having in spaced adjacent relation to said first end a cavity for receiving a polymeric molding compounds which is a transverse aperture extending completely through the plastic strip, for attachment to a second strip and there being a molding compound conveying means connecting said first end and said cavity and a plurality of conductive member receiving means interposed at spaced intervals between said cavity and said second end.

2. The plastic strip of claim 1 wherein a molding compound conveying means connects the first end of the strip and the cavity for receiving the polymeric molding compound.

3. The plastic strip of claim 1 wherein the cavity for receiving the polymeric molding compound is a pair of parallel transverse apertures in the plastic strip.

4. The plastic strip of claim 3 wherein the parallel transverse apertures are connected by at least one molding compound conveying means.

5. The plastic strip of claim 4 wherein the there are a first and a second axial molding compound conveying means connecting said transverse apertures and said first conveying means is superimposed over said second conveying means.

6. The plastic strip of claim 1 wherein the conductive member receiving means are pin receiving cavities.

7. The plastic strip of claim 1 wherein there are a plurality of lateral notches on the strip.

8. The plastic strip of claim 1 wherein said strip has a height of from about 0.100 inch to about 0.500 inch.

9. The plastic strip of claim 8 wherein the plastic strip has a width of from about 0.050 inch to about 0.500 inch.

10. The plastic strip of claim 7 wherein the lateral notches have an angular width from about 10° to about 75°.

11. The plastic strip of claim 10 wherein the lateral notches have a depth of from about 10 percent of the width of the strip to about 40 percent of the width of the strip.

12. The plastic strip of claim 1 wherein said strip has a length from about 5 feet to about 5000 feet.

13. The plastic strip of claim 1 wherein said strip is comprised of a polymeric molding compound having a tensile elongation of from about 1 percent to about 20 percent.

14. The plastic strip of claim 1 wherein the strip is comprised of a polymeric molding compound having a flexural modulus of from about 300,000 psi to about 2,500,000 psi.

15. A plastic strip used in the manufacture of an unshrouded insulative housing for an electrical connector without use of a separate longitudinal spine or carrier comprising an elongated body formed of first and second polymeric sections which are formed from separate injections of a polymeric molding compound and wherein said first polymeric section is contained in a first length having opposed first and second ends and wherein said second length is positioned in axial abutting relation to said first length at said first end of said first length and said second polymeric section is contained in said second length and in a space in the first length adjacent the first end of the first length which extends transversely completely through the strip and in an axial tongue extending between said space and the second length and wherein said strip has a plurality of axially spaced conductor member receiving means.

16. The plastic strip of claim 15 wherein the space adjacent the first end of the first length filled by the second polymeric section which extends transversely completely through the strip is a generally cylindrically shaped space.

17. The plastic strip of claim 16 wherein the second polymeric section fills a pair of spaced generally cylindrically shaped spaces which extend transversely in parallel relation across the plastic strip.

18. The plastic strip of claim 17 wherein the parallel transverse spaces are connected by an axial bridge.

19. The plastic strip of claim 18 wherein the parallel transverse spaces are connected by first and second axial bridges wherein said first bridge is positioned in spaced superimposed relation over said second bridge.

20. The plastic strip of claim 19 wherein the axial tongue projects from each of the parallel transverse spaces in opposed relation to the connecting axial bridge.

21. The plastic strip of claim 20 wherein a pair of transversely spaced axial tongues extend from each of the parallel transverse spaces in opposed relation to the connecting axial bridge.

22. The plastic strip of claim 15 wherein the conductive member receiving means comprise transverse pin receiving apertures.

23. The plastic strip of claim 22 wherein a transverse pin receiving apertures is concentrically positioned in the transverse cylindrical space.

24. The plastic strip of claim 17 wherein there are a pair of pin receiving apertures and each of said apertures extends transversely through the strip in concentric relation to one of said cylindrically shaped spaces.

25. The plastic strip of claim 16 wherein the second polymeric section fills two pairs of spaced generally cylindrically shaped spaces which extend transversely in parallel relation across the plastic strip.

26. The plastic strip of claim 25 wherein the cylindrically shaped spaces in each of said pairs positioned in side by side relation are connected by a laterally extending bridge.

27. The plastic strip of claim 26 wherein the parallel transverse spaces are connected by first and second bridges wherein said first bridge is positioned in spaced superimposed relation over said second bridge.

28. The plastic strip of claim 26 wherein the two pairs of cylindrically shaped spaces are connected by an axial bridge.

29. The plastic strip of claim 28 wherein the two pairs of cylindrically shaped spaces are connected by first and second axial bridges wherein said first bridge is positioned in spaced superimposed relation over said second bridge.

30. The plastic strip of claim 28 wherein the axial tongue projects from the laterally extending bridge in opposed relation to the axial bridge.

31. The plastic strip of claim 15 wherein there are a plurality of lateral notches on the strip.

32. The plastic strip of claim 15 wherein said strip has a height of from about 0.100 inch to about 0.500 inch.

33. The plastic strip of claim 26 wherein the plastic strip has a width of from about 0.050 inch to about 0.500 inch.

34. The plastic strip of claim 31 wherein the lateral notches have an angular width from about 10° to about 75°.

35. The plastic strip of claim 34 wherein the lateral notches have a depth of from about 10 percent of the width of the strip to about 40 percent of the width of the strip.

36. The plastic strip of claim 15 wherein said strip has a length from about 5 feet to about 5000 feet.

37. The plastic strip of claim 15 wherein the polymeric molding compound has a tensile elongation of from about 1 percent to about 20 percent.

38. The plastic strip of claim 15 wherein the polymeric molding compound has a flexural modulus of from about 300,000 psi to about 2,500,000 psi.

39. The plastic strip of claim 15 wherein conductive elements are engaged in the conductive element receiving means.

40. A plastic strip used in the manufacture of unshrouded insulative housings for electrical connectors without use of a separate longitudinal spine or carrier comprising the product of a process comprising the steps of:
  (a) providing an elongated mold for forming a length of said plastic strip having first and second opposed ends and wherein there is a means for forming a cavity, which is a transverse aperture extending completely through the plastic strip, in spaced adjacent relation to said first end in said length of plastic strip and a means for forming a molding compound conveying means between said first end and said cavity and at spaced intervals there are means for forming conductive element receiving means in said length of said plastic strip;
  (b) at least partially filling said elongated mold with a polymeric molding compound and allowing said molding compound to at least partially harden to form a first length of plastic strip having a cavity adjacent the first end and a plurality of spaced conductive element receiving means interposed between the first and second ends of the mold;
  (c) partially displacing the first length of plastic strip formed in step (b) axially from the second end of the mold such that the cavity in the plastic strip length formed in step (b) remains in the mold; and
  (d) again at least partially filling the elongated mold including the cavity in the plastic strip length formed in step (b) with the polymeric molding compound and allowing said molding compound to at least partially harden to form a second length of plastic strip contiguous with said first length of plastic strip.

41. The plastic strip of claim 40 wherein the mold includes a means for forming a pair of transverse apertures for receiving molding compound in the plastic strip.

42. The plastic strip of claim 41 wherein the apertures are connected by at least one axial recess.

43. The plastic strip of claim 42 wherein the apertures are connected by an axial first recess superimposed over an axial second recess.

44. The plastic strip of claim 40 wherein there is a molding compound receiving space in the molds and the means for forming the major cavity is a projection extending into said molding compound receiving space.

45. The plastic strip of claim 41 wherein there is a base wall and a projection extends from said base wall into said molding compound receiving space.

46. The plastic strip of claim 45 wherein the projection extending from the base wall into said molding compound receiving space comprises a first and a second cylinder.

47. The plastic strip of claim 46 wherein at least one bridge connects said first and second cylinder.

48. The plastic strip of claim 47 wherein between said first and second cylinder a first bridge is superimposed over a second bridge.

49. The plastic strip of claim 48 wherein at least one projection extends from said first cylinder toward the first end of the mold.

50. The plastic strip of claim 47 wherein at least one projection extends from the second cylinder toward the second end of the mold.

51. The plastic strip of claim 40 wherein the means for receiving the conducting elements comprise a plurality of conductive element receiving cavities substantially openly spaced on the strip.

52. The plastic strip of claim 40 wherein there are a plurality of projections extending from the base wall axially spaced between the second cylinder and the second end of the mold to form pin receiving cavities.

53. The plastic strip of claim 40 wherein means are provided for producing lateral notches in the plastic strip length.

54. The plastic strip of claim 40 wherein a plurality of projections extend from the lateral walls of the mold into the molding compound receiving space to produce lateral notches in the plastic strip length.

55. The plastic strip of claim 40 wherein the polymeric molding compound is a wholly aromatic thermoplastic polymer.

56. The plastic strip of claim 40 wherein the polymeric molding compound is a liquid crystal polymer.

57. The plastic strip of claim 40 wherein the polymeric molding compound is selected from the group consisting of polyamides, polyesters, polyolefins, polycarbonates, polyketones and polyphenylenes.

58. The plastic strip of claim 40 wherein the distance from the first end of the mold to the second end of the mold is from about 0.5 inch to about 24 inches.

59. The plastic strip of claim 57 wherein the steps are sequentially repeated until an overall plastic strip length from about 5 feet to about 5,000 feet is formed.

60. The plastic strip of claim 59 wherein the plastic strip is wound on a reel having an inside diameter of more than about 10 inches.

61. The plastic strip of claim 59 wherein the plastic strip is cut into segments at least at some of the notches.

62. The plastic strip of claim 40 wherein the plastic strip has a height of from about 0.100 inch to about 0.500 inch.

63. The plastic strip of claim 62 wherein the plastic strip has a width of from about 0.050 inch to about 0.500 inch.

64. The plastic strip of claim 40 wherein the lateral notches have an angular width of from about 10° to about 75°.

65. The plastic strip of claim 64 wherein the lateral notches have a depth from about 10 percent of the width of the strip to about 40 percent of the width of the strip.

66. The plastic strip of claim 40 wherein the plastic strip is comprised of a polymeric molding compound having a tensile elongation of from about 1 percent to about 20 percent.

67. The plastic strip of claim 40 wherein the plastic strip is comprised of a polymeric molding compound having a flexural modulus of from about 300,000 psi to about 2,500,000 psi.

68. The plastic strip of claim 40 wherein conductive elements are engaged in the conductive element receiving means.

69. A plastic strip used in the manufacture of unshrouded insulative housings for electrical connectors without use of a separate longitudinal spine or carrier comprising an elongated body having a first and second end and having in spaced adjacent relation to said first end a cavity for receiving a polymeric molding compound, which is a transverse aperture extending completely through the plastic strip, for attachment to a second strip and there being a first molding compound conveying means connecting said first end and said cavity, a second molding compound conveying means connecting said first end and said cavity in spaced relation to said first molding compound conveying means, and a plurality of conductive member receiving means interposed at spaced intervals between said cavity and said second end.

70. A plastic strip used in the manufacture of an unshrouded insulative housing for an electrical connector without use of a separate longitudinal spine or carrier comprising an elongated body formed of first and second polymeric sections which are formed from separate injections of a polymeric molding compound and wherein said first polymeric section is contained in a first length having opposed first and second ends and wherein said second length is positioned in axial abutting relation to said first length at said first end of said first length and said second polymeric section is contained in said second length and in a space in the first length which extends transversely completely through the strip and which is adjacent the first end of the first length and in a first and a second axial bridge extending between said space and the second length and wherein said strip has a plurality of axially spaced conductor member receiving means.

71. A plastic strip used in the manufacture of unshrouded insulative housings for electrical connectors without use of a separate longitudinal spine or carrier comprising the product of a process comprising the steps of:

(a) providing an elongated mold for forming a length of said plastic strip having first and second opposed ends and wherein there is a means for forming a cavity, which is a transverse aperture extending completely through the plastic strip, in spaced adjacent relation to said first end in said length of plastic strip and a means for forming a first molding compound conveying means between said first end and said cavity and a second molding compound conveying means positioned in spaced relation to said first molding compound conveying means and at spaced intervals there are means for forming conductive element receiving means in said length of said plastic strip;

(b) at least partially filling said elongated mold with a polymeric molding compound and allowing said molding compound to at least partially harden to form a first length of plastic strip having a cavity adjacent the first end and a plurality of spaced conductive element receiving means interposed between the first and second ends of the mold;

(c) partially displacing the first length of plastic strip formed in step (b) axially from the second end of the mold such that the cavity in the plastic strip length formed in step (b) remains in the mold; and (d) again at least partially filling the elongated mold including the cavity in the plastic strip length formed in step (b) with the polymeric molding compound and allowing said molding compound to at least partially harden to form a second length of plastic strip contiguous with said first length of plastic strip.

72. The plastic strip of claim 69 wherein the plastic strip is comprised of a polymeric molding compound having a tensile elongation of from about 1 percent to about 20 percent.

73. The plastic strip of claim 69 wherein the plastic strip is comprised of a polymeric molding compound having a flexural modulus of from about 300,000 psi to about 2,500,000 psi.

74. The plastic strip of claim 70 wherein the plastic strip is comprised of a polymeric molding compound having a tensile elongation of from about 1 percent to about 20 percent.

75. The plastic strip of claim 70 wherein the plastic strip is comprised of a polymeric molding compound having a flexural modulus of from about 300,000 psi to about 2,500,000 psi.

76. The plastic strip of claim 71 wherein the plastic strip is comprised of a polymeric molding compound having a tensile elongation of from about I percent to about 20 percent.

77. The plastic strip of claim 71 wherein the plastic strip is comprised of a polymeric molding compound having a flexural modulus of from about 300,000 psi to about 2,500,000 psi.

* * * * *